US010835832B2

(12) United States Patent
Fontiveros Penso et al.

(10) Patent No.: US 10,835,832 B2
(45) Date of Patent: Nov. 17, 2020

(54) GAP COVERING SYSTEMS AND METHODS FOR AMUSEMENT PARK ATTRACTIONS

(71) Applicant: Universal City Studios LLC, Universal City, CA (US)

(72) Inventors: Maria Cariota Fontiveros Penso, Miami Springs, FL (US); Rachel Sarah Wilcox, Orlando, FL (US); David Gerard Majdali, Orlando, FL (US)

(73) Assignee: Universal City Studio LLC, Universal City, CA (US)

( * ) Notice: Subject to any disclaimer, the term of this patent is extended or adjusted under 35 U.S.C. 154(b) by 0 days.

(21) Appl. No.: 16/692,930

(22) Filed: Nov. 22, 2019

(65) Prior Publication Data

US 2020/0306652 A1 Oct. 1, 2020

Related U.S. Application Data

(60) Provisional application No. 62/827,144, filed on Mar. 31, 2019, provisional application No. 62/849,542, (Continued)

(51) Int. Cl.
*A63G 4/00* (2006.01)
*B60R 21/01* (2006.01)
(Continued)

(52) U.S. Cl.
CPC ............... *A63G 4/00* (2013.01); *B60R 21/01* (2013.01); *B61B 1/02* (2013.01); *B60R 2021/0097* (2013.01)

(58) Field of Classification Search
CPC .......... A63G 4/00; A63G 31/00; A63G 31/02; A63G 31/06; A63G 31/08; A63G 1/00;
(Continued)

(56) References Cited

U.S. PATENT DOCUMENTS

| 368,420 A | 8/1887 | Pearsons |
|---|---|---|
| 922,052 A | 5/1909 | Sherk |

(Continued)

FOREIGN PATENT DOCUMENTS

| CN | 203543951 U | 4/2014 |
|---|---|---|
| DE | 3142790 | 5/1983 |

(Continued)

OTHER PUBLICATIONS

PCT/US2020/018774 International Search Report and Written Opinion dated Jun. 25, 2020.

(Continued)

*Primary Examiner* — Michael D Dennis
(74) *Attorney, Agent, or Firm* — Fletcher Yoder, P.C.

(57) ABSTRACT

A gap covering system for an amusement park attraction includes a loading platform having a gap separating a first portion of the loading platform from a second portion of the loading platform. The gap covering system includes a ride vehicle coupled, through the gap, to a transport. The transport is configured to propel the ride vehicle along a loading path of the loading platform. The gap covering system includes a magnetic zipper positioned adjacent to the loading platform and configured to transition between a first configuration and a second configuration in at least a portion of the magnetic zipper. The magnetic zipper is configured to cover the gap in the first configuration and is configured to allow the ride vehicle to occupy a guest-accessible position on the loading platform in the second configuration.

20 Claims, 9 Drawing Sheets

Related U.S. Application Data filed on May 17, 2019, provisional application No. 62/858,663, filed on Jun. 7, 2019.

(51) Int. Cl.
*B61B 1/02* (2006.01)
*B60R 21/00* (2006.01)

(58) Field of Classification Search
CPC .. B60R 21/01; B60R 2021/0097; B66B 21/10
USPC .............................. 472/29; 104/53; 356/4.01
See application file for complete search history.

(56) References Cited

U.S. PATENT DOCUMENTS

| | | | |
|---|---|---|---|
| 929,130 A | 7/1909 | Helliesen | |
| 1,116,160 A | 11/1914 | Swedberg | |
| 1,216,560 A | 2/1917 | Gallinant | |
| 2,168,061 A | 8/1939 | Christie et al. | |
| 3,095,216 A | 6/1963 | Browne et al. | |
| 3,727,558 A | 4/1973 | Winkle | |
| 3,730,361 A | 5/1973 | Haynes | |
| 3,791,308 A | 2/1974 | Hartz | |
| 4,308,697 A | 1/1982 | Guppy | |
| 4,347,791 A * | 9/1982 | Mandros | B60V 3/04 |
| | | | 104/156 |
| 4,369,984 A | 1/1983 | Hagen | |
| 4,488,326 A | 12/1984 | Cherry | |
| 4,543,886 A | 10/1985 | Spieldiener et al. | |
| 4,694,522 A | 9/1987 | Alten | |
| 4,759,682 A | 7/1988 | Hood | |
| 5,033,392 A | 7/1991 | Schemitsch | |
| 5,150,659 A | 9/1992 | Bickel | |
| 5,161,104 A | 11/1992 | Fox et al. | |
| 5,197,923 A | 3/1993 | Barber | |
| 5,357,869 A | 10/1994 | Barjolle et al. | |
| 5,453,053 A | 9/1995 | Danta et al. | |
| 5,463,962 A | 11/1995 | Gnezdilov | |
| 5,558,198 A | 9/1996 | Juarez | |
| 5,560,468 A | 10/1996 | Inoue | |
| 5,810,147 A | 9/1998 | Vanmoor | |
| 5,832,555 A | 11/1998 | Saucier et al. | |
| 5,845,580 A | 12/1998 | Muller et al. | |
| 5,845,582 A * | 12/1998 | Coester | B61B 13/122 |
| | | | 104/156 |
| 5,931,288 A * | 8/1999 | Avery | B61B 5/025 |
| | | | 198/860.5 |
| 5,994,644 A | 11/1999 | Rindoks et al. | |
| 6,352,034 B1 * | 3/2002 | Bolliger | A63G 7/00 |
| | | | 104/27 |
| 6,440,002 B1 | 8/2002 | Jackson | |
| 6,595,344 B1 | 7/2003 | Davis et al. | |
| 6,880,301 B2 | 4/2005 | Hahn et al. | |
| 6,898,816 B2 | 5/2005 | Tholen et al. | |
| 7,354,351 B2 * | 4/2008 | Edwards | A63G 31/12 |
| | | | 104/53 |
| 7,762,895 B2 | 7/2010 | Zamperla et al. | |
| 7,784,405 B2 * | 8/2010 | Rose | A63G 7/00 |
| | | | 104/20 |
| 7,802,337 B2 | 9/2010 | van Roosmalen et al. | |
| 7,802,521 B2 * | 9/2010 | Gunes | B61B 1/02 |
| | | | 104/30 |
| 7,908,976 B2 | 3/2011 | Pujol | |
| 8,020,496 B1 | 9/2011 | Maysonet | |
| 8,141,495 B2 | 3/2012 | Baker et al. | |
| 8,375,864 B1 | 2/2013 | Crawford et al. | |
| 8,556,283 B2 | 10/2013 | Coochesfahani | |
| 8,601,953 B2 * | 12/2013 | Hachet | A61G 3/06 |
| | | | 105/436 |
| 9,505,330 B2 | 11/2016 | Hirtenlehner et al. | |
| 9,932,045 B2 | 4/2018 | Geddie et al. | |
| 10,065,123 B2 | 9/2018 | Zamperla | |
| 10,099,708 B2 | 10/2018 | Krueger | |
| 10,106,069 B2 | 10/2018 | Rasekhi | |
| 10,183,844 B1 | 1/2019 | Howes | |
| 10,279,274 B1 | 5/2019 | Brister et al. | |
| 2001/0042489 A1 | 11/2001 | Yamaguchi et al. | |
| 2003/0070576 A1 | 4/2003 | Vicent-Genod | |
| 2008/0134930 A1 | 6/2008 | Drago | |
| 2009/0017927 A1 | 1/2009 | Shozi et al. | |
| 2009/0120319 A1 | 5/2009 | Muller et al. | |
| 2010/0058949 A1 | 3/2010 | Lomberty et al. | |
| 2010/0078291 A1 | 4/2010 | Fritsche | |
| 2013/0059670 A1 | 3/2013 | Crawford et al. | |
| 2019/0239587 A1 * | 8/2019 | Klein-Kassab | A44B 19/267 |

FOREIGN PATENT DOCUMENTS

| | | | |
|---|---|---|---|
| EP | 1201280 | B1 | 4/2008 |
| JP | 4167132 | B2 | 10/2008 |
| JP | 5401084 | B2 | 1/2014 |
| KR | 20010082872 | A | 8/2001 |
| WO | 2005108161 | A1 | 11/2005 |
| WO | 2010027239 | A2 | 3/2010 |

OTHER PUBLICATIONS

PCT/US2020/021192 International Search Report and Written Opinion dated May 27, 2020.
PCT/US2020/021092 International Search Report and Written Opinion dated May 27, 2020.
Accessible Amusement Rides—A Summary of Accessibility Guidelines, United States Access Board, Jun. 2003, 18 pgs.
World's First Freeform Escalator, https://www.youtube.com/watch?v=x58272OirGU, Published Oct. 1, 2010, Publisher Laboratory Equipment (1:48 minutes).
Super Escalator Adventure—Only in Japan, https://www.youtube.com/watch?v=P6pKmISsUTo, published Mar. 11, 2013, Publisher Only in Japan (4:20 minutes).
Hydra the Revenge off-ride HD Dorney Park, https://www.youtube.com/watch?time_continue=35&v=xNNfmFupb04, published Jun. 26, 2015, Publisher CoasterForce (5:58 minutes).
Platform Gap Filler, Website: https://en.wikipedia.org/wiki/Platform_gap_filler, pp. 1-3 (Accessed on Nov. 1, 2017).

* cited by examiner

GAP COVERING SYSTEMS AND METHODS FOR AMUSEMENT PARK ATTRACTIONS

CROSS-REFERENCE TO RELATED APPLICATIONS

This application claims priority to and the benefit of U.S. Provisional Application No. 62/827,144, entitled "FALL HAZARD PREVENTION SYSTEMS FOR AMUSEMENT PARK ATTRACTIONS," filed Mar. 31, 2019, U.S. Provisional Application No. 62/849,542, entitled "FALL HAZARD PREVENTION SYSTEMS FOR AMUSEMENT PARK ATTRACTIONS," filed May 17, 2019, and U.S. Provisional Application No. 62/858,663, entitled "FALL HAZARD PREVENTION SYSTEMS FOR AMUSEMENT PARK ATTRACTIONS," filed Jun. 7, 2019, which are hereby incorporated by reference in their entireties for all purposes.

BACKGROUND

The present disclosure relates generally to amusement park ride systems for amusement parks. More particularly, embodiments of the present disclosure relate to systems and methods for covering gaps in certain amusement park ride systems that may expose aesthetically unappealing features of the ride systems to guests of the amusement park.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Recently, there has been a growing interest in increasing an efficiency of loading passengers (e.g., guests) into ride vehicles of attractions of amusement parks. Accordingly, some attractions may include a loading system having a loading platform that permits passengers to unload from a ride vehicle and/or to load into the ride vehicle while the ride vehicle moves along a loading path. Certain locations along the loading platform may therefore include uncovered gaps that generally permit the ride vehicle and/or components propelling the ride vehicle to travel along the loading path without interference with the loading platform. However, visually exposing such ride vehicle components through the uncovered gaps may reduce an overall aesthetic appearance of the attraction. Moreover, passengers loading/unloading from the ride vehicle and/or other guests walking across the loading platform may lose items in such uncovered gaps along the loading platform.

SUMMARY

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a gap covering system for an amusement park attraction includes a loading platform having a gap separating a first portion of the loading platform from a second portion of the loading platform. The gap covering system includes a ride vehicle coupled, through the gap, to a transport. The transport is configured to propel the ride vehicle along a loading path of the loading platform. The gap covering system includes a magnetic zipper positioned adjacent to the loading platform and configured to transition between a first configuration and a second configuration in at least a portion of the magnetic zipper. The magnetic zipper is configured to cover the gap in the first configuration and is configured to allow the ride vehicle to occupy a guest-accessible position on the loading platform in the second configuration.

In an embodiment, a gap covering system for a ride system of an amusement park includes a turntable configured to rotate about an axis. The gap covering system also includes an outer platform disposed about the turntable to form a gap between the turntable and the outer platform. The gap covering system further includes a ride vehicle coupled, through the gap, to a transport, where the transport is configured to propel the ride vehicle about the axis. The gap covering system includes a magnetic zipper having a first section extending outwardly from the turntable and a second section extending from the outer platform toward the first section. The first and second sections of the magnetic zipper are configured to engage at an interface to cover the gap in a first configuration of the magnetic zipper. The magnetic zipper is configured to transition from the first configuration to a second configuration in a portion of the magnetic zipper that permits the ride vehicle to occupy a guest-accessible position along the turntable.

In an embodiment, a method of operating a gap covering system for an amusement park attraction includes magnetically coupling a first section of a magnetic zipper to a second section of the magnetic zipper to form a surface that extends across a gap of a loading platform to cover the gap. The method includes propelling a ride vehicle along a path adjacent to the loading platform via a transport. The method also includes magnetically decoupling the first section from the second section along at least a portion of the magnetic zipper as the ride vehicle travels along the path to form an opening in the magnetic zipper, where a support structure extends through the opening to couple the ride vehicle to the transport.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
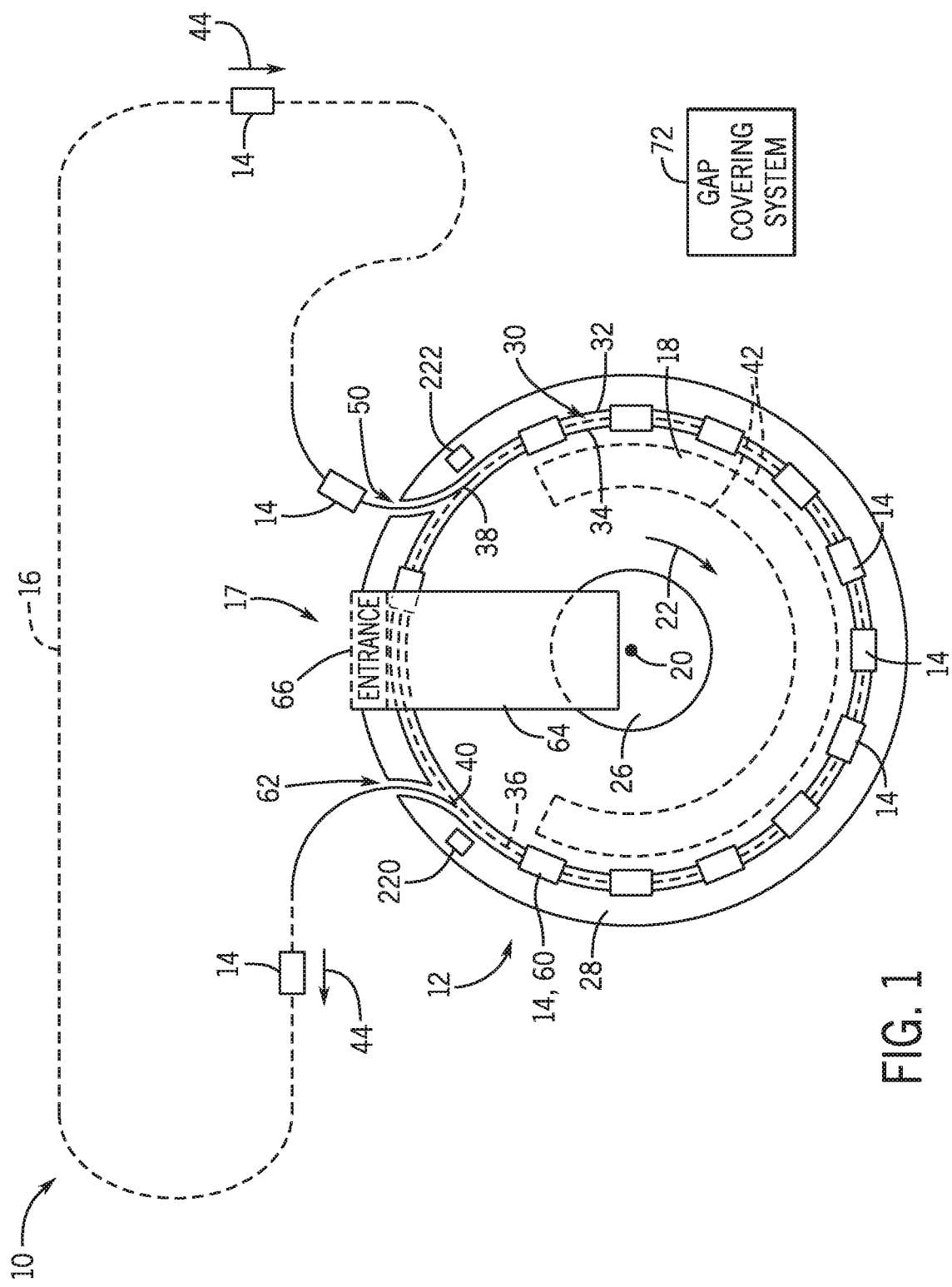
FIG. 1 is a schematic top view of an embodiment of a ride system, in accordance with aspects of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Certain amusement park attractions may include loading systems that permit passengers to load into and/or unload from ride vehicles of the attractions while the ride vehicles travel along the loading system. The system may include a loading platform configured as a turntable, or, as discussed below, as a linear platform, which is stationary or that is configured to rotate about an axis (e.g., a central vertical axis) about which the vehicles move. A stationary outer platform may be disposed about a portion of the turntable or substantially all of the turntable to form a gap between the turntable and the outer platform. The gap may define a loading path along which ride vehicles may travel during loading and/or unloading of passengers from the ride vehicles. In some embodiments, the ride vehicles may travel along the loading path at a speed that is substantially equal to a rotational speed of the turntable. That is, the rotational speed of the ride vehicles about the axis may substantially match the rotational speed of the turntable, such that relative movement between the ride vehicles and the turntable may be substantially unperceivable. As such, an edge of the turntable may be substantially stationary relative to an edge of a particular ride vehicle to permit passengers to board into or unload from the ride vehicle without having to walk along the ride vehicle to adjust to a speed of the ride vehicle during such loading/unloading procedures. In this manner, the loading system may facilitate loading and unloading of passengers into non-stationary ride vehicles. However, the gap between the turntable and the outer platform may expose aesthetically unappealing features of the attraction, such as a transport used for propelling the ride vehicle along the loading path, to the passengers of the attraction. Moreover, passengers loading/unloading into the ride vehicles may lose items (e.g., keys, coins, cellular phones) in such uncovered portions of the gap that are positioned adjacent to or are otherwise surrounding the ride vehicles.

Therefore, embodiments of the present disclosure are directed to a gap covering system that is configured to selectively cover the gap, while still permitting ride vehicles to move along or within the gap during operation of the loading system. For example, embodiments of the gap covering system discussed herein include a magnetic zipper (e.g., an electromagnetic zipper) having a first portion (e.g., an inner zipper section) that may be coupled to and/or disposed adjacent to the turntable and a second portion (e.g., an outer zipper section) that may be coupled to and/or disposed adjacent to the outer platform. As discussed in detail below, a plurality of magnets (e.g., permanent magnets, electromagnets) may be coupled to the first portion and/or to the second portion of the magnetic zipper. Certain of the magnets are configured to selectively engage and selectively disengage with one another to permit the first and second portions of the magnetic zipper to unblock (e.g., uncover, expose) portions of the gap along which a ride vehicle travels and to block (e.g., cover) other portions of the gap that are not occupied by the ride vehicle. Accordingly, the magnetic zipper may permit ride vehicles to travel along the loading system to receive and/or unload passengers at any suitable location along the turntable, while guests' view of aesthetically unappealing features of the attraction that may be positioned within and/or beneath the gap is substantially blocked or obscured. Moreover, the magnetic zipper may block of items (e.g., keys, coins, cellular phone) that may be accidentally dropped by guests from falling into and/or through the gap. As discussed below, certain embodiments of the magnetic zipper may also include inflatable sections that are configured inflate and deflate to facilitate selectively covering or uncovering, respectively, portions of the gap during operation of the loading system. Indeed, the inflatable sections may facilitate covering aesthetically unappealing features of the attraction that may be exposed through the gap during operation of the attraction. These and other features will be described below with reference to the drawings.

It is important to note that, while the present disclosure describes the embodiments of the gap covering system (e.g., the magnetic zipper assembly) as configured for use in an amusement park setting, it should be appreciated that the disclosed embodiments of the gap covering system may be implemented to selectively cover various gaps that may be present in a variety of industrial settings. For example, embodiments of the gap covering system discussed herein may be used to cover gaps that may be present in various conveyor systems or other devices utilized for moving components along a path (e.g., a track). As such, the gap covering system may be used to enhance an aesthetic appearance of such conveyor systems by obscuring a line of sight to certain conveyor components that are typically exposed through the gap.

Turning now to the figures, FIG. 1 is a schematic of an embodiment of a ride system 10 (e.g., an attraction) of an amusement park. The ride system 10 includes a loading system 12 that facilitates loading and/or unloading of passengers (e.g., guests of the amusement park) into ride vehicles 14 of the ride system 10. For example, passengers may load into the ride vehicles 14 at the loading system 12, may travel along an attraction path 16 of the ride system 10, and may arrive back at the loading system 12 to unload from the ride vehicles 14. While traveling along the attraction path 16, passengers may be exposed to a variety of experiences, such as virtual reality, alternate reality, environment interactions, multiple ride paths, water features, special effects, and so forth. It should be noted that portions of the ride system 10, such as the attraction path 16, have been intentionally simplified to focus on aspects of the loading system 12.

In the depicted embodiment, the loading system 12 includes loading platform 17 having a turntable 18 (e.g., a first portion of the loading platform 17) that is configured to rotate (e.g., at a substantially constant rotational speed) about an axis 20. However, it should be understood that the embodiments disclosed herein may also be used with a stationary loading platform that does not rotate. In the illustrated embodiment, the turntable 18 is substantially circular and rotates in a clockwise direction 22 about the axis 20. However, in other embodiments, the turntable 18 may be any suitable shape, which may correspond to a theme of the ride system 10, and may rotate in a counter-clockwise direction about the axis 20. Moreover, in certain embodiments, the turntable 18 may be replaced with a belt or other track system (e.g., a linear platform and associated track system) that is configured to travel along a linear path or along another predetermined path (e.g., a non-symmetric path). In some embodiments, the turntable 18 may include a stationary portion 26 disposed therein, which is not configured to rotate about the axis 20. That is, the turntable 18 may include a generally annular shape and may be disposed about the stationary portion 26, such that the turntable 18 may rotate about the axis 20 relative to the stationary portion 26.

As shown in the illustrated embodiment, the turntable 18 is at least partially circumscribed by an outer platform 28 (e.g., a second portion of the loading platform 17), which, in some embodiments, is configured to remain stationary relative to the axis 20. The outer platform 28 may be spaced apart from the turntable 18, such that a gap 30 is formed between an inner edge 32 of the outer platform 28 and an outer edge 34 of the turntable 18. The attraction path 16 may be coupled to a loading path 36 that extends along the gap 30 and about the axis 20. Particularly, the loading path 36 may extend along the gap 30 between a terminal end 38 and an initiating end 40 of the remaining attraction path 16. Accordingly, the loading path 36 may form a portion of the overall attraction path 16. As discussed in detail below, passengers may load into and/or unload from the ride vehicles 14 along the loading path 36. A portion of the turntable 18 that is positioned adjacent to the loading path 36 at a particular instance in time will be referred to herein as a loading zone 42 of the loading system 12 (e.g., the loading zone 42 may be indicative of a region of the turntable 18 outlined by the illustrated phantom lines).

The ride vehicles 14 may travel along the attraction path 16 in a direction of travel 44. The ride vehicles 14 may enter the loading path 36 via an entry avenue 50 (e.g., a path or passage) that may be formed within the outer platform 28. In some embodiments, the loading path 36 extends about the axis 20 of the turntable 18 (e.g., the loading path 36 has a radius extending from the axis 20). As such, the ride vehicles 14 may travel in conjunction with (i.e., together with or at the same speed as) the turntable 18 along a length of the loading path 36. For example, while traveling along the loading path 36, the ride vehicles 14 may travel at substantially the same speed about the axis 20 as the rotational speed of the turntable 18 about the axis 20. In this manner, a position and an orientation of each of the ride vehicles 14 along loading zone 42 of the turntable 18 may remain substantially constant. In other words, each ride vehicle 14 may maintain a temporarily fixed position relative to a circumference of the turntable 18 while traveling along the loading path 36 and while the turntable 18 rotates about the axis 20. In this manner, the loading system 12 may substantially maintain an orientation of the turntable 18 relative to the ride vehicles 14, which may include seats facing towards the outer edge 34, while the ride vehicles 14 travel along the loading path 36. Accordingly, passengers may board into the ride vehicles 14 from the loading zone 42 or may unload from the ride vehicles 14 onto the loading zone 42 without having to walk along a particular ride vehicle 14 to adjust to a speed of the ride vehicle 14 during such loading/unloading procedures. It should be understood that, in certain embodiments, respective speeds of the ride vehicles 14 along the loading path 36 may be less than an average speed of the ride vehicles 14 along a remaining portion of the attraction path 16. Upon completion of loading/unloading procedures, the ride vehicles 14 may exit the loading path 36 via an exit avenue 62 adjacent to the initiating end 40 of the attraction path 16.

As shown in the illustrated embodiment, an entrance ramp 64 may extend between an entrance 66 of the ride system 10 and the stationary portion 26 of the loading system 12. In some embodiments, the entrance ramp 64 may be any suitable angled path, which may include stairs, a substantially flat angled surface, an escalator, or any combination thereof. Accordingly, guests may enter (e.g., walk onto) the stationary portion 26 from the entrance 66 while certain ride vehicles 14 or other moving components of the loading system 12 travel about the axis 20 (e.g., beneath the entrance ramp 64). Generally, guests may, from the stationary portion 26, step onto the loading zone 42 of the turntable 18, and subsequently board into a particular one of the ride vehicles 14 traveling along the loading zone 42. It should be understood that, to exit the ride system 10, guests may dismount from the ride vehicles 14 onto the loading zone 42, walk toward the stationary portion 26, and may subsequently exit to the loading system 12 via the entrance ramp 64.

Figure 2:
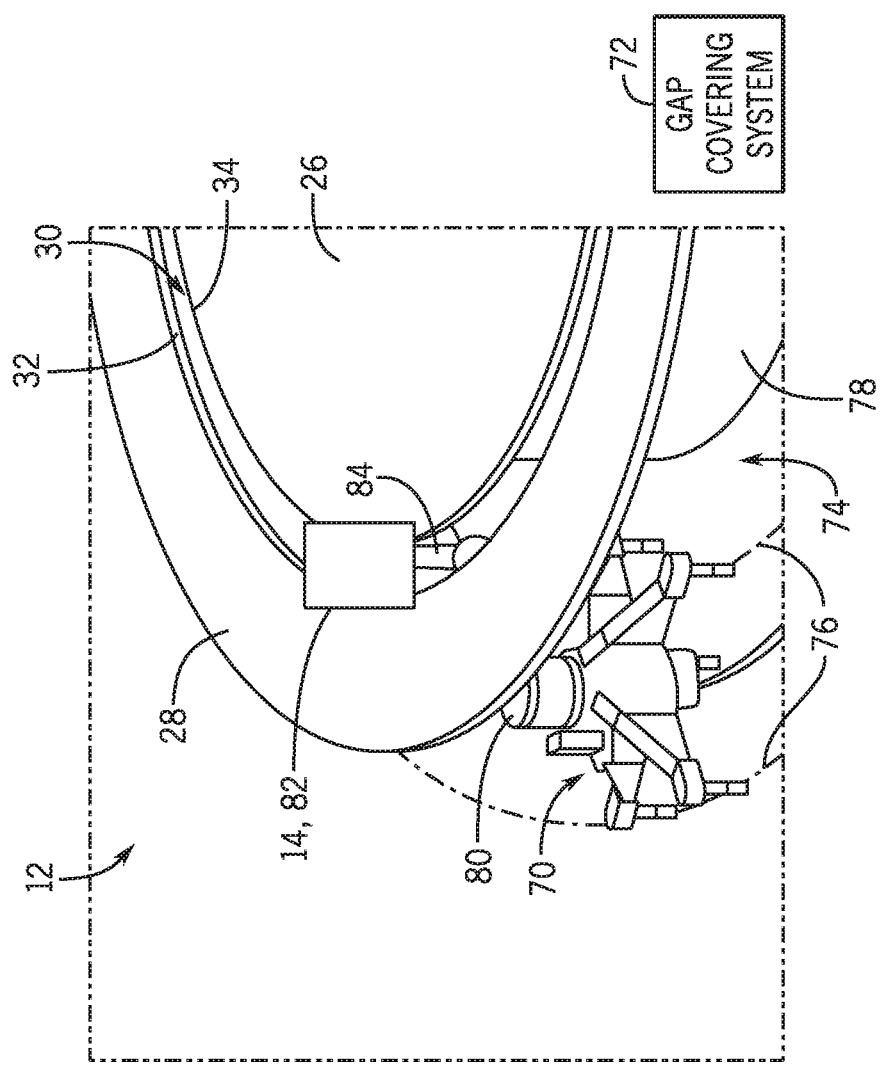
FIG. 2 is a perspective view of an embodiment of a ride system, in accordance with aspects of the present disclosure.

The ride vehicles 14 travel along the loading path in a track-based or trackless system. In an embodiment, each of the ride vehicles 14 traveling along the loading path 36 may be associated with a respective transport 70, as shown in FIG. 2, which is configured to propel the ride vehicles 14 along the loading path 36 and about the axis 20. In certain embodiments, the transport 70 may be disposed partially beneath the turntable 18 and/or the outer platform 28 and may be coupled to a particular ride vehicle 14 via a support structure extending through the gap 30. Indeed, the gap 30 may permit the transport 70 to couple to and propel a corresponding ride vehicle 14 along the loading path 36. Unfortunately, visually exposing certain ride system 10 components, such as the transport 70, through the gap 30 may reduce an aesthetic appeal of the ride system 10. Moreover, guests loading and/or unloading from the ride vehicles 14 or otherwise walking adjacent to the loading path 36 may accidentally lose certain items (e.g., keys, coins, cellular phones) in the gap 30 by dropping the items into the gap 30.

Accordingly, embodiments of the ride system 10 discussed herein are equipped with a gap covering system 72 that is configured to substantially cover portions of the gap 30 to block guests' view to aesthetically unappealing features of the ride system 10 that may be exposed through the gap 30. More specifically, the gap covering system 72 is configured to selectively cover portions of the gap 30 that are not occupied by components of the ride vehicles 14 or otherwise covered by the ride vehicles 14 (e.g., covered by respective chassis of the ride vehicles 14). Accordingly, the gap covering system 72 may permit the ride vehicles 14 to continuously move along the loading path 36 while aesthetically unappealing features (e.g., the transport 70) of the ride system 10 that may be positioned within or below the gap 30 are substantially obscured.

To better illustrate the transport 70 and to facilitate the subsequent discussion of the gap covering system 72 as used in conjunction with the transport 70, FIG. 2 is a perspective view of an embodiment of the loading system 12. As shown in the illustrated embodiment, the transport 70 is positioned in a space 74 beneath the turntable 18 and/or the outer platform 28 and is engaged with a guide track 76. The guide track 76 may extend about a frame 78 supporting the turntable 18 and permit the transport 70 to propel along the guide track 76 about the axis 20. In some embodiments, the guide track 76 and the loading path 36 may include the same path or track structure. A robotic manipulator 80 may couple the transport 70 to one of the ride vehicles 14, referred to hereinafter as a ride vehicle 82, to permit the transport 70 to move the ride vehicle 82 along the loading path 36. As shown in the illustrated embodiment, the robotic manipulator 80 may include a support structure 84 (e.g., a shaft) that extends through the gap 30 and engages with the ride vehicle 82. As such, the support structure 84 may facilitate coupling the ride vehicle 82 to the transport 70 positioned beneath the turntable 18 and/or the outer platform 28. For clarity, it should be understood that, as used herein, a "ride vehicle" may refer to any one or combination of components of the ride vehicle 82 (e.g., any one of the ride vehicles 14), the robotic manipulator 80, and/or the transport 70.

Figure 3:
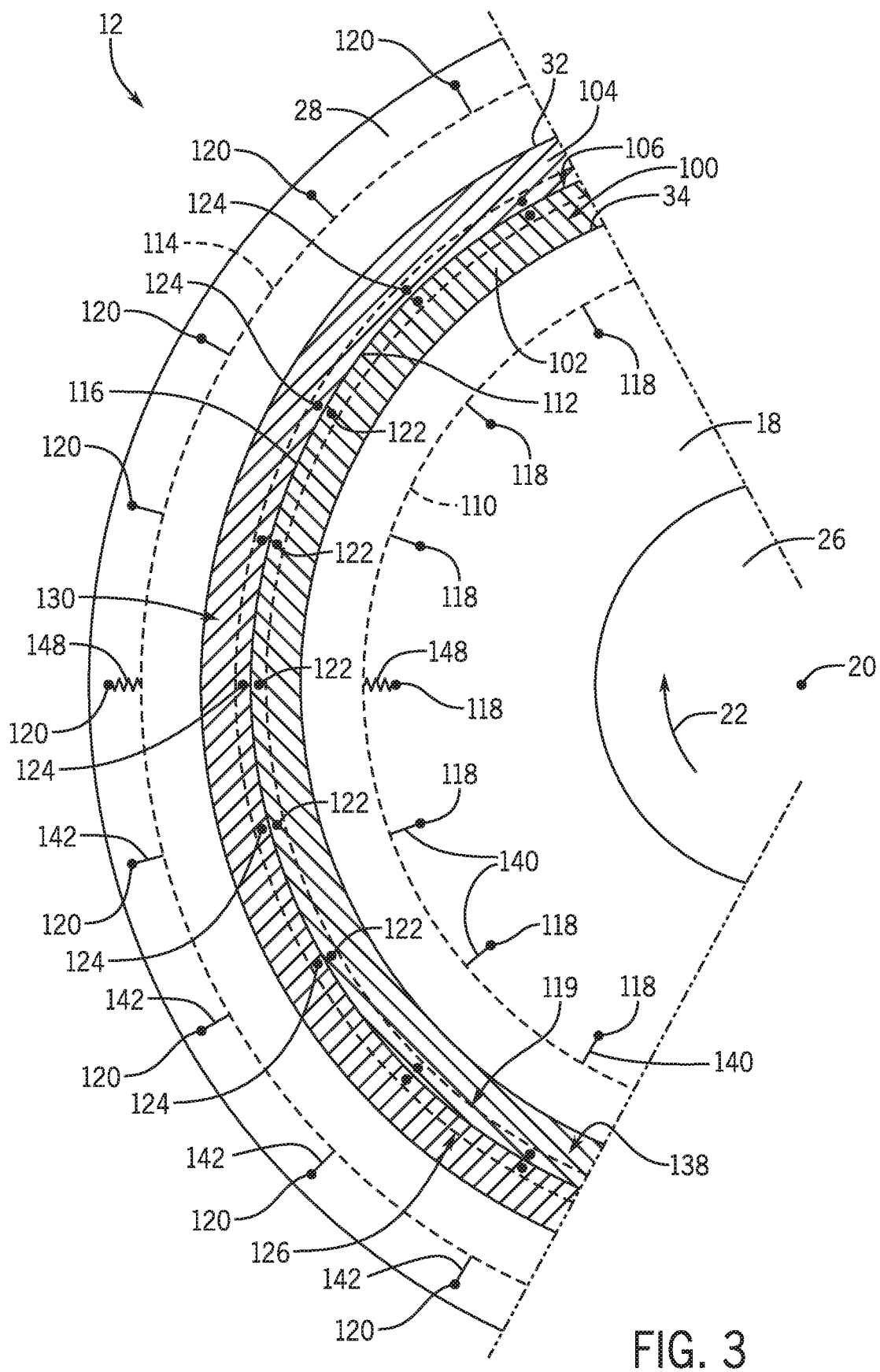
FIG. 3 is a schematic top view of an embodiment of a gap covering system for a ride system including a magnetic zipper, in accordance with aspects of the present disclosure.

FIG. 3 is a top view of an embodiment of the loading system 12. In the illustrated embodiment, the turntable 18 is configured to rotate about the axis 20 in the clockwise direction 22 while the outer platform 28 remains stationary relative to the axis 20. However, it should be understood that, in other embodiments, the outer platform 28 may rotate about the axis 20 while the turntable 18 remains stationary. Moreover, in certain embodiments, both the turntable 18 and the outer platform 28 may be configured to rotate about the axis 20 or may be stationary.

In the illustrated embodiment, the gap covering system 72 includes a magnetic zipper 100 that is configured to selectively cover (e.g., block) or uncover (e.g. unblock) the gap 30, depending on a configuration or state of all or part of the magnetic zipper 100. For example, in some embodiments, the magnetic zipper 100 includes an inner zipper section 102 and an outer zipper section 104 that are configured to selectively couple or decouple from one another at an interface 106 that may overlap with the gap 30. Portions of the inner and outer zipper sections 102, 104 may selectively engage at the interface 106 to cover the gap 30 and may selectively disengage at the interface 106 to uncover the gap 30. Particularly, as discussed in detail below, the inner and outer zipper sections 102, 104 may be selectively coupled to one another via a magnet system of the gap covering system 72.

In the illustrated embodiment, the inner zipper section 102 extends from a first end portion 110 (e.g., a radially inner edge) to a second end portion 112 (e.g., a radially outer edge) of the inner zipper section 102. The outer zipper section 104 extends from a first end portion 114 (e.g., a radially outer edge) to a second end portion 116 (e.g., a radially inner edge) of the outer zipper section 104. The first end portion 110 of the inner zipper section 102 may be coupled to a plurality of inner support points 118 (e.g., stationary support structures) that, in some embodiments, may be disposed beneath the turntable 18. For example, the inner support points 118 may be coupled to and/or may include a portion of the frame 78 of the turntable 18 or may include other suitable structures that are stationary with respect to the axis 20. The first end portion 114 of the outer zipper section 104 may be coupled to a plurality of outer support points 120 of the outer platform 28. Similar to the inner support points 118, the outer support points 120 may be substantially stationary relative to the axis 20. The outer support points 120 may be integrated with the outer platform 28 or may be coupled to a structure positioned adjacent to the outer platform 28.

In some embodiments, each of the inner and outer zipper sections 102, 104 may be made of a flexible material and/or an elastic material. For example, the inner and outer zipper sections 102, 104 may be made of a woven polypropylene mesh (e.g., such as used in trampolines), vinyl or nylon coated fabrics, rubber, plastic, polyurethane, and/or another suitable material or combination of materials. In some embodiments, the inner zipper section 102 may include a first engaging region 119 having a plurality of first magnets 122 (e.g., permanent magnets, electromagnets) coupled thereto or otherwise integrated with the first engaging region 119. The outer zipper section 104 may include a plurality of second magnets 124 (e.g., permanent magnets, electromagnets) that are coupled to a second engaging region 126 of the outer zipper section 104 or are otherwise integrated with the second engaging region 126.

In an engaged configuration 130 (e.g., a zipped configuration) of the magnetic zipper 100, the first magnets 122 are configured to magnetically engage with (e.g., magnetically coupled to) corresponding ones of the second magnets 124 to permit the magnetic zipper 100 to substantially cover the gap 30. That is, portions of the magnetic zipper 100 in the engaged configuration 130 may correspond to portions of the inner and outer zipper sections 102, 104 that contact or partially overlap one another along the interface 106 (e.g., due to magnetic engagement of the first and second magnets 122, 124) to substantially cover the gap 30.

As discussed in detail below, in some embodiments, the first magnets 122 and the second magnets 124 may be permanent magnets that are configured to attract one another. In other embodiments, the first magnets 122 or the second magnets 124 may be replaced with a reaction material (e.g., a metallic material), such that the first magnets 122 (e.g., permanent magnets) or the second magnets 124 (e.g., permanent magnets) may attract the reaction material. As an example, in such embodiments, the first magnets 122 may magnetically couple to or magnetically decouple from a reaction material, instead of the second magnets 124, which may be woven into or otherwise integrated with the outer zipper section 104.

Alternatively, the first magnets 122 may be electromagnets and the second magnets 124 may be permanent magnets that are configured to attract the first magnets 122 (i.e., electromagnets) when the first magnets 122 are not energized. In this manner, the second magnets 124 attract the core (e.g., iron core) of the first magnets 122 when the first magnets 122 are not energized, at which time the core of the first magnets 122 acts as a reaction material. Then, when the first magnets 122 are energized, the first magnets 122 repel the second magnets 124. More particularly, when the first magnets 122 are energized, a surface of the core of the first magnet 122 that was magnetically coupled to the second magnet 124, and the surface of the second magnet 124 that was magnetically coupled to the first magnet 122, have a same polarity and thereby repel each other.

In further embodiments, the first magnets 122 and the second magnets 124 may be electromagnets that are selectively energizable to attract or to repel one another. Indeed, as discussed below, a polarity of electrical power supplied to the electromagnets may be selectively reversible to enable the electromagnets to transition between an attractive state (e.g., an energized state), in which the electromagnets may attract another magnet (e.g., permanent magnet, electromagnet) or a suitable reaction material, and a repelling state (e.g., an energized state), in which the electromagnets may repel another magnet (e.g., permanent magnet, electromagnet). For example, in certain embodiments, the first magnets 122 may be electromagnets and the second magnets 124 may be permanent magnets. In such embodiments, the first magnets 122 may be selectively energizable to attract or to repel the second magnets 124. Conversely, in other embodiments, the second magnets 124 may be electromagnets and the first magnets 122 may be permanent magnets, such that the second magnets 124 may be selectively energizable to attract or repel the first magnets 122.

Again, it should be appreciated that the first magnets 122 or the second magnets 124 may be replaced with a reaction material (e.g., a metallic material), such that the first magnets 122 (e.g., electromagnets) or the second magnets 124 (e.g., electromagnets) may be configured to selectively attract the reaction material. Moreover, it should be understood that any other suitable combination of magnets (e.g., permanent magnets, electromagnets) or reaction materials may be used in the inner and/or outer zipper sections 102, 104 in addition to, or in lieu of, the examples discussed above. Indeed, it should be appreciated that the first magnets 122 and the second magnets 124 may include permanent magnets (e.g., neodymium magnets), electromagnets, various reaction materials, or a combination thereof.

In some embodiments, the inner and outer zipper sections 102, 104 may be sized such that the inner and outer zipper sections 102, 104 are taut (e.g., under a tensile force) when the first magnets 122 engage with the second magnets 124. Accordingly, an aesthetically pleasing surface 138 may be formed by the magnetic zipper 100 (e.g., a surface of the magnetic zipper 100 between the inner and outer edges 32, 34) that may extend substantially level between the turntable 18 and the outer platform 28 (e.g., with respect to a surface of the turntable 18 and/or a surface of the outer platform 28). The aesthetically pleasing surface 138 may cover the gap 30 to obstruct guests' view to the transport 70 or other components of the ride system 10 that may be operate within and/or below the gap 30. In some embodiments, the aesthetically pleasing surface 138 may include graphics, insignias, or other themed features that may augment a theme of the ride system 10 (e.g., a space theme, a jungle theme). As such, the magnetic zipper 100 may enhance an overall aesthetic appearance of the ride system 10.

In some embodiments, the inner zipper section 102 and/or the outer zipper section 104 may stretch or elongate over time (e.g., due to material fatigue), such that the inner and outer zipper sections 102, 104 are no longer taut when the magnetic zipper 100 is in the engaged configuration 130. As a result, the aesthetically pleasing surface 138 of the magnetic zipper 100 may sag or droop over time, such that the aesthetically pleasing surface 138 may no longer be level. As such, in some embodiments, a first set of adjustable links 140 may be used to couple the inner zipper section 102 to the inner support points 118 and/or a second set of adjustable links 142 may be used to couple the outer zipper section 104 to the outer support points 120. The first and second sets of adjustable links 140, 142 may be adjustable in length to account for stretching of the inner and outer zipper sections 102, 104. For example, upon identifying that the inner and outer zipper sections 102, 104 are no longer taut in the engaged configuration 130 of the magnetic zipper 100, a ride technician or other operator may adjust the first and second sets of adjustable links 140, 142 (e.g., shorten the first and/or second sets of adjustable links 140, 142) to re-apply tension to the inner and outer zipper sections 102, 104. Accordingly, the first and second sets of adjustable links 140, 142 may ensure that the wear of the inner and/or outer zipper sections 102, 104 does not affect a position of the aesthetically pleasing surface 138.

It should be appreciated that the first and second sets of adjustable links 140, 142 may include threaded rods, adjustable actuators, or any other suitable devices that are adjustable in length. In some embodiments, the first and second sets of adjustable links 140, 142 may be replaced with springs 148 that are configured to apply a tensile force to the inner and outer zipper sections 102, 104 when the magnetic zipper 100 is in the engaged configuration 130. The springs 148 may be configured to account for stretching of the inner and outer zipper sections 102, 104 over time. That is, the springs 148 may ensure that the inner and outer zipper sections 102, 104 remain taut when the magnetic zipper 100 is in the engaged configuration 130, even if the inner and outer zipper sections 102, 104 elongate (e.g., due to material fatigue) over time.

Figure 4:
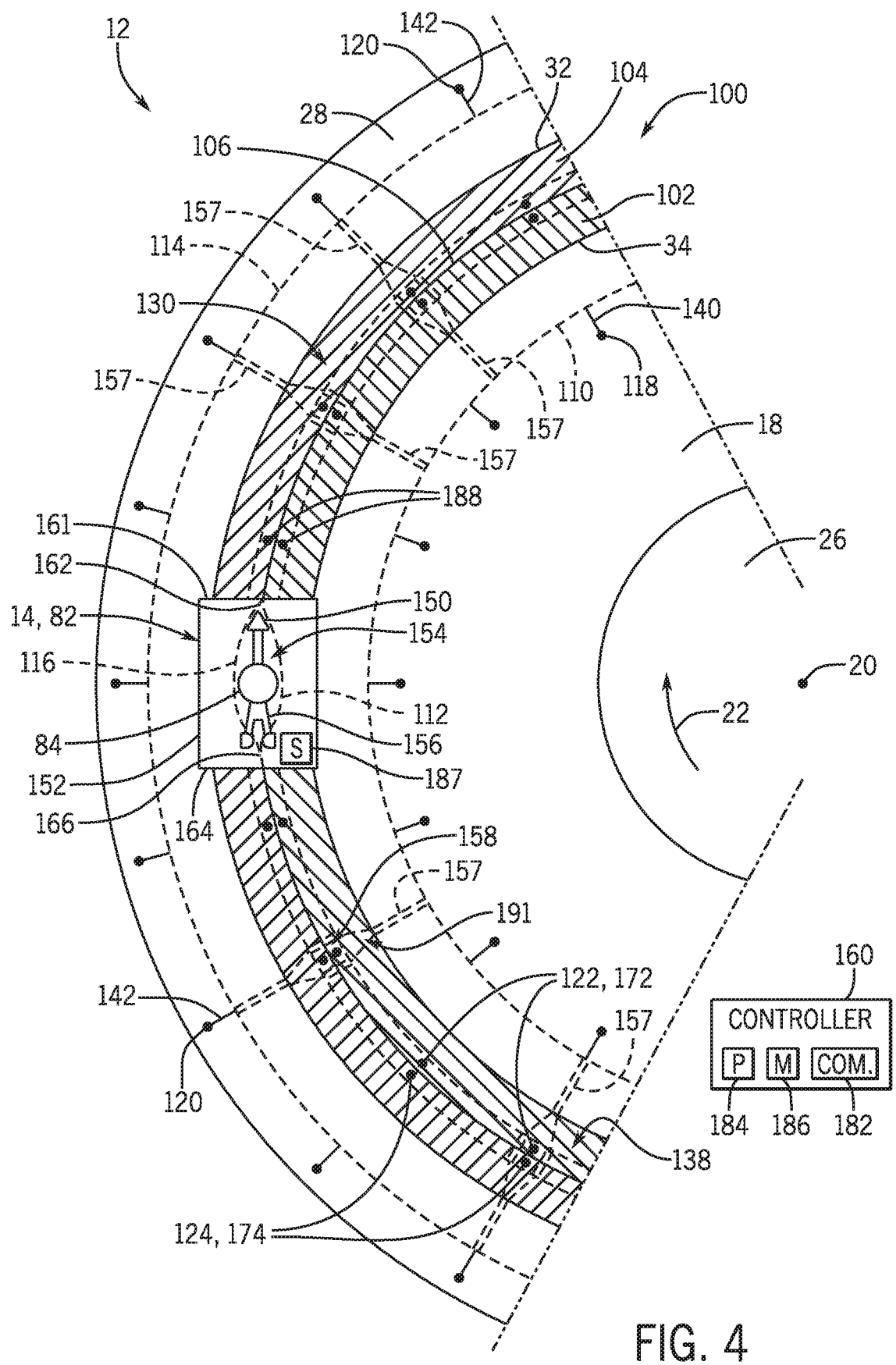
FIG. 4 is a schematic top view of an embodiment of a gap covering system for a ride system including a magnetic zipper, in accordance with aspects of the present disclosure.

As discussed above, the magnetic zipper 100 permits the ride vehicle 82 to travel along the loading path 36 while obstructing guests' visibility to certain ride system 10 components positioned within and/or below the gap 30. To better illustrate and to facilitate the following discussion, FIG. 4 is a top view of an embodiment of the loading system 12. In some embodiments, the ride vehicle 82 includes a forward plow 150 (e.g., a first engagement feature) that is configured to engage with (e.g., physically contact) the magnetic zipper 100 at the interface 106 when the ride vehicle 82 enters the loading path 36 from the terminal end 38 of the attraction path 16. The forward plow 150 may be coupled to a chassis 152 of the ride vehicle 82, to a portion of the robotic manipulator 80 (e.g., to the support structure 84), and/or to a suitable component of the transport 70. The forward plow 150 may include a wedge-shape or another suitable shape that is configured to engage the magnetic zipper 100 to sequentially magnetically decouple (e.g., separate) the first magnets 122 (e.g., permanent magnets) from the second magnets 124 (e.g., permanent magnets) as the ride vehicle 82 moves along the loading path 36 in the clockwise direction 22. That is, as the transport 70 moves the ride vehicle 82 along the loading path 36, the forward plow 150 may impart a force on the inner and outer zipper sections 102, 104 at the interface 106 that is sufficient to overcome the magnetic attraction force between the first and second magnet 122, 124 and, as such, spread apart (e.g., unzip) the inner and outer zipper sections 102, 104. In this manner, the forward plow 150 may create an opening 154 (e.g., an unzipped section of the magnetic zipper 100) between the inner zipper section 102 and the outer zipper section 104 that permits the support structure 84 of the robotic manipulator 80 to extend through and to travel along the gap 30 without interference with the magnetic zipper 100.

In some embodiments, the ride vehicle 82 may include a rearward plow 156 (e.g., a second engagement feature) that is positioned opposite to the forward plow 150 (e.g., that is positioned behind the forward plow 150, with respect to a direction of movement of the ride vehicle 82). The rearward plow 156 may be coupled to the chassis 152 of the ride vehicle 82, to a portion of the robotic manipulator 80 (e.g., to the support structure 84), and/or to a suitable component of the transport 70. The rearward plow 156 may be configured to engage (e.g., physically contact) the inner zipper section 102 and the outer zipper section 104 to guide the inner and outer zipper sections 102, 104 toward one another as the ride vehicle 82 travels along the loading path 36. Accordingly, the rearward plow 156 may facilitate sequentially magnetically re-engaging the first magnets 122 with the second magnets 124. That is, the rearward plow 156 may facilitate re-zipping a particular section of the magnetic zipper 100 after the support structure 84 has passed that section of the magnetic zipper 100.

In some embodiments, the loading system 12 may also include one or more biased supports 157 extending along or within the magnetic zipper 100 to facilitate re-zipping of the magnetic zipper 100 and to provide structural support to the fabric of the inner zipper section 102 and the outer zipper section 104. For example, the biased supports 157 may be arranged at intervals along the inner zipper section 102 that are aligned with the biased supports 157 along the outer zipper section 104. The biased supports 157 may be attached to the magnetic zipper 100 at attachment points 158. In this manner, the biased supports 157 may meet at the interface 106 to extend across the gap 30. When the inner zipper section 102 and the outer zipper section 104 separate from one another to admit the ride vehicle 82, complementary biased supports 157 may also fold inwards. That is, the biased supports 157 on the inner zipper section 102 fold towards or retract into the turntable 18 and the biased supports on the outer zipper section 104 fold towards or retract into the outer platform 28. The biased supports 157 may be mechanically, hydraulically, and/or pneumatically actuated. As discussed in detail below, to that end, the biased supports 157 may include actuatable joints 159 or other actuatable features that actuate responsive to signals from a controller 160 that may be coordinated based on a location of the ride vehicle 82 along the loading path 36.

For example, the controller 160 may, based on an identified location of the ride vehicle 82 (e.g., determined via sensor feedback), instruct corresponding biased supports 157 positioned forward of the ride vehicle 82 (e.g., near the forward plow 150) to transition to respective retracted positions (e.g., beneath the turntable 18 or the outer platform 28) when the ride vehicle 82 approaches these biased supports 157. As such, the biased supports 157 may facilitate unzipping of the magnetic zipper 100 as the ride vehicle 82 travels along the loading path 36 in the clockwise direction 22. The controller 160 may, upon determining that the support structure 84 has passed a particular set of biased supports 157 positioned in the retracted positions, instruct these biased supports 157 to return to corresponding extended positions, such that the biased supports 157 may facilitate moving the inner and outer zipper sections 102, 104 toward one another. In this manner, the biased supports 157 may facilitate magnetic recoupling of the first and second magnets 122, 124 as the ride vehicle 82 travels along the loading path 26. It should be appreciated that, in some embodiments, the forward plow 150, the rearward plow 156, or both, may be omitted from the ride vehicle 82. For example, in certain embodiments, the support structure 84 may be configured to engage with the magnetic zipper 100 to force apart the inner and outer zipper sections 102, 104 instead of the forward plow 150. Moreover, it should be appreciated that the biased supports 157 may be sufficient to permit zipping and un-zipping of the magnetic zipper 100 without involving use of the forward and/or rearward plows 150, 156.

In some embodiments, the forward plow 150 may be positioned such that a leading edge 161 of the chassis 152 is configured to overlap with (e.g., protrude past) a leading vertex 162 of the opening 154. The rearward plow 156 may be positioned such that a trailing edge 164 of the chassis 152 overlaps (e.g., protrudes past) a trailing vertex 166 of the opening 154. In this manner, the forward and rearward plows 150, 156 may ensure that substantially no portion of the opening 154 is exposed to guests of the ride system 10 as the ride vehicle 82 travels along the loading path 36. That is, the forward and rearward plows 150, 156 may ensure that substantially all of the gap 30 remains covered to guests by the inner and outer zipper sections 102, 104 and/or the chassis 152 of the ride vehicle 84 as the ride vehicle 82 moves along the loading path 36, such that the guests are unable to view unaesthetic features of the ride system 10 that may be positioned within and/or below the gap 30.

As noted above, in some embodiments, the first magnets 122, the second magnets 124, or both, may include electromagnets. In other words, the first magnets 122 may include first electromagnets 172 and the second magnets 124 may include second electromagnets 174. In some embodiments, each of the first and second electromagnets 172, 174 may be selectively energizable or de-energizable based on a position of the ride vehicle 82 along the loading path 36, which may facilitate zipping and unzipping of the magnetic zipper 100 as the ride vehicle 82 moves along the loading path 36. For example, the controller 160 may be operatively coupled to the first and second electromagnets 172, 174 via electrical lines and/or suitable communication lines and is configured to selectively energized or de-energize certain of the first and/or second electromagnets 172, 174. It should be understood that the first electromagnets 172, the second electromagnets 174, or both, may be selectively energized to attract another electromagnet, a corresponding permanent magnet, or a reaction material (e.g., a metallic material). Moreover, in other embodiments, the first electromagnets 172, the second electromagnets 174, or both, may be selectively energized to repel another electromagnet or a corresponding permanent magnet. In any case, as shown in the illustrated embodiment, the controller 160 may include communication circuitry 182, a processor 184, and a memory 186. The processor 184 may include a microprocessor, which may execute software for controlling the components of the loading system 12, such as the biased supports 157, the first and second electromagnets 172, 174, and/or for controlling any other suitable components of the loading system 12 and/or the ride system 10. It should be appreciated that, in some embodiments, the controller 160 may be integrated with or include a portion of a central ride controller of the ride system 10.

The processor 184 may include multiple microprocessors, one or more "general-purpose" microprocessors, one or more special-purpose microprocessors, and/or one or more application specific integrated circuits (ASICS), or some combination thereof. For example, the processor 184 may include one or more reduced instruction set (RISC) processors. The memory 186 may include a volatile memory, such as random access memory (RAM), and/or a nonvolatile memory, such as read-only memory (ROM). The memory 186 may store information, such as control software, look up tables, configuration data, etc. For example, the memory 186 may store processor-executable instructions including firmware or software for the processor 184 execute, such as instructions for controlling the biased supports 157, the first and second electromagnets 172, 174 or other components of the loading system 12 and/or of the ride system 10. In some embodiments, the memory 186 is a tangible, non-transitory, machine-readable-medium that may store machine-readable instructions for the processor 184 to execute. The memory 186 may include ROM, flash memory, a hard drive, or any other suitable optical, magnetic, or solid-state storage medium, or a combination thereof.

In some embodiments, the controller 160 may be configured to receive feedback from one or more sensors 187 indicative of a position of the ride vehicle 82 along the attraction path 16 and/or the loading path 36. For example, global positioning system (GPS) sensors may be coupled to the ride vehicle 82 and may be used to provide the controller 160 with feedback indicative of the location (e.g., real-time location) of the ride vehicle 82. In other embodiments, a variety of other suitable sensors, such as proximity sensors, may be used in addition to or in lieu of the GPS sensors to determine a position of the ride vehicle 82 along the attraction path 16 and/or along the loading path 36. Moreover, in some embodiments, the controller 160 may receive feedback indicative of a location of the ride vehicle 82 from a central ride controller configured to control operations of the ride system 10.

The controller 160 may be configured to energize certain of the first and second electromagnets 172, 174 to maintain some portions of the magnetic zipper 100 in the engaged configuration 130, and may be configured to de-energize other of the first and second electromagnets 172, 174 to permit separation of the inner zipper section 102 from the outer zipper section 104 along other portions of the magnetic zipper 100. For example, upon determining that the ride vehicle 82 approaches a particular set of the first and second electromagnets 172, 174, referred to herein as anterior magnets 188, the controller 160 may transition these electromagnets from an energized state to a de-energized state. For clarity, as used herein, the anterior magnets 188 may be indicative of one or more electromagnets positioned immediately in front of the leading edge 161 of the chassis 152, with respect to a direction of movement of the ride vehicle 82 along the loading path 36. By de-energizing the anterior magnets 188, the controller 160 may permit the forward plow 150 and/or the support structure 84 to more easily spread apart the inner and outer zipper sections 102, 104 at the leading vertex 162. Indeed, in a de-energized state, a magnetic force (e.g., an attractive force) between the anterior magnets 188 may be substantially negligible. In subsequent discussion, de-energized electromagnets that are positioned beneath the ride vehicle 82 (e.g., below the chassis 152) will be referred to herein as "inactive electromagnets magnets."

In some embodiments, the controller 160 may be configured to re-energize the inactive magnets passing below the ride vehicle 82 upon determining that the support structure 84 has traveled past (e.g., in the clockwise direction 22) the inactive magnets. As such, the re-energized electromagnets may magnetically attract one another to permit re-zipping of the magnetic zipper 100. Accordingly, by selectively energizing and de-energizing certain of the first and second electromagnets 172, 174, the controller 160 may facilitate zipping and unzipping of the magnetic zipper 100 via the forward plow 150, the rearward plow 156, and/or the biased supports 157, in accordance with the techniques discussed above. For example, deactivation of an individual electromagnet may be coordinated with simultaneous retraction of an associated or co-located biased support 157. Similarly, biased supports 157 co-located with activated electromagnets may be in an extended or supporting configuration. It should be noted that, in other embodiments, the selective energization and de-energization of the first and second electromagnets 172, 174 may be sufficient to induced zipping and/or unzipping of the magnetic zipper 100, such that the forward plow 150 and/or the rearward plow 156 may be omitted from the ride vehicle.

It should be appreciated that, in certain embodiments, the controller 160 may be configured to transition the anterior magnets 188 to a repelling state, instead of a de-energized state, upon determining that the ride vehicle 82 approaches the anterior magnets 188. For example, the controller 160 may be configured to provide and to switch a polarity of electrical power (e.g., voltage) applied to the anterior magnets 188 to transition the anterior magnets from an attractive state, in which the anterior magnets 188 are configured to attract one another, to the repelling state, in which the anterior magnets 188 are configured to repel one another. By transitioning the anterior magnets 188 to the repelling state, the controller 160 may permit the anterior magnets 188 to spread apart (e.g., separate) the inner and outer zipper sections 102, 104 along the interface 106 (e.g., at the leading vertex 162). In subsequent discussion, electromagnets that are positioned beneath the ride vehicle 82 (e.g., below the chassis 152) in the repelling state will be referred to herein as "repelling electromagnets."

In some embodiments, the controller 160 may be configured to reverse a polarity of electrical power supplied to the repelling electromagnets passing below the ride vehicle 82 upon determining that the support structure 84 has traveled past (e.g., in the clockwise direction 22) the repelling electromagnets. As such, the repelling electromagnets may be returned to the attractive state, such that these electromagnets may magnetically re-attract one another to permit re-zipping of the magnetic zipper 100. Accordingly, by selectively reversing a polarity of electrical power supplied to certain of the first and second electromagnets 172, 174, the controller 160 may facilitate zipping and unzipping of the magnetic zipper 100 via the forward plow 150, the rearward plow 156, and/or the biased supports, in accordance with the techniques discussed above. For example, transitioning of an individual electromagnet to the repelling state may be coordinated with simultaneous retraction of an associated or co-located biased support 157. Similarly, biased supports 157 co-located with electromagnets in the attractive state may be in an extended or supporting configuration.

In further embodiments, electromagnets and permanent magnets may be arranged within the magnetic zipper 100 in a manner that ensures that the gap 30 remains substantially covered even during, for example, a loss of electrical power to the ride system 10. For example, in some embodiments, the first magnets 122 may be the first electromagnets 172 and the second magnets 124 may be permanent magnets. In such embodiments, the first electromagnets 172 may be transitioned to respective attractive states when the ride vehicle 82 is not positioned along a particular section of the magnetic zipper 100, such that the first electromagnets 172 along this section of the magnetic zipper 100 may attract the second magnets 124. In accordance with the techniques discussed above, upon determining that the ride vehicle 82 approaches a particular first electromagnet 172 and corresponding second magnet 124, referred to hereinafter as the anterior magnets 188, the controller 160 may transition the particular first electromagnet 172 of the anterior magnets 188 from the attractive state to the repelling state, such that the particular first electromagnet 172 may repel the corresponding second magnet 124. Indeed, by transitioning the first electromagnet 172 of the anterior magnets 188 to the repelling state, the controller 160 may permit the anterior magnets 188 to spread apart (e.g., separate) the inner and outer zipper sections 102, 104 along the interface 106 (e.g., at the leading vertex 162). In accordance with the techniques discussed above, the controller 160 may return the first electromagnet 172 of the anterior magnets 188 to the attractive state to enable re-zipping of the magnet zipper 100 once the ride vehicle 82 has passed a particular section of the magnetic zipper 100.

It should be appreciated that, during a loss of electrical power to the ride system 10, the second electromagnets 124 may continue to attract, for example, a metallic core (e.g., an iron core) of the corresponding first electromagnets 172. As such, even during such a power loss situation in which the first electromagnets 172 are de-energized, the second electromagnets 124 may ensure that the magnetic zipper 100 remains zipped and substantially covers the gap 30.

Figure 5:
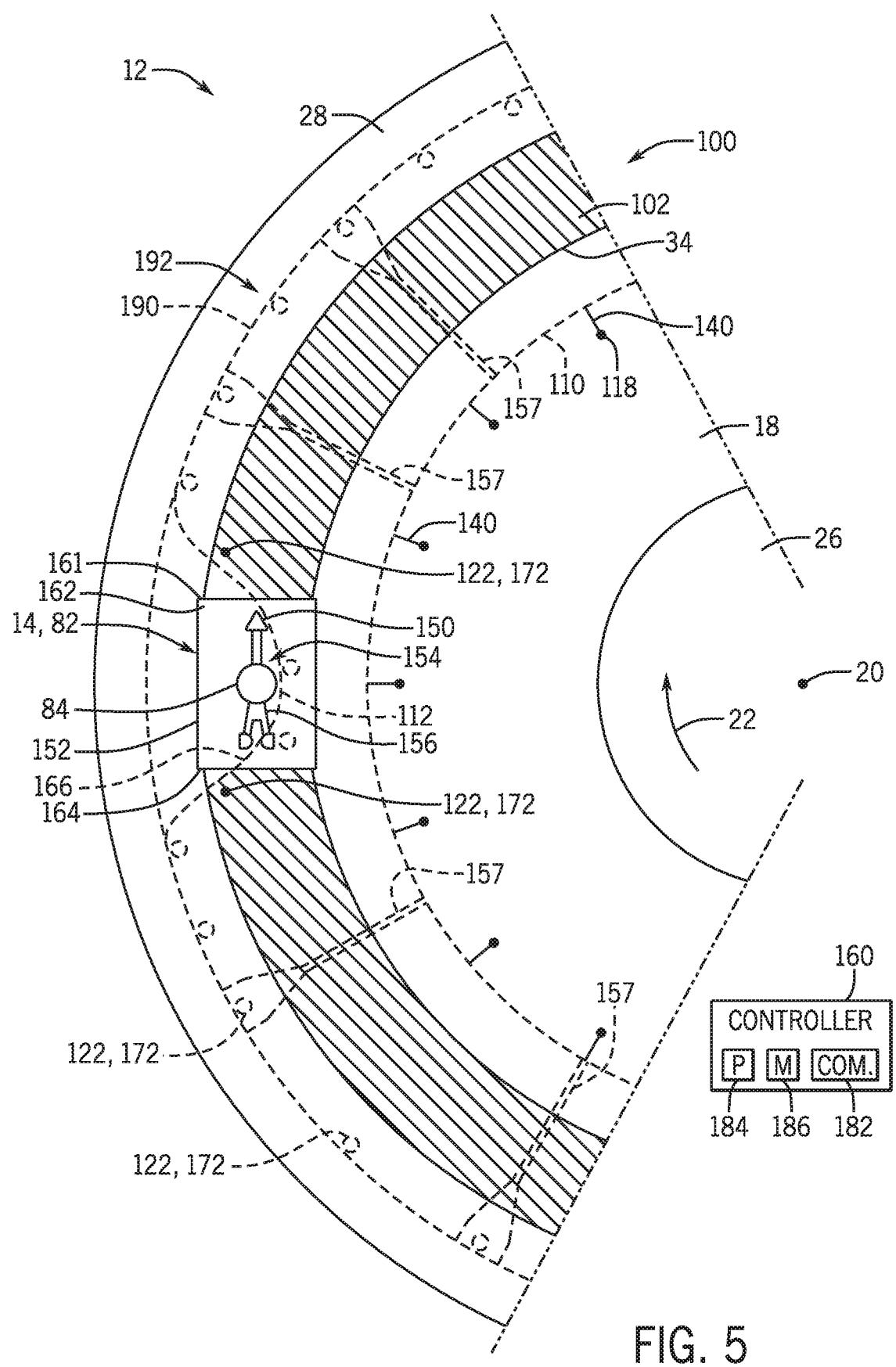
FIG. 5 is a schematic top view of an embodiment of a gap covering system for a ride system including a magnetic zipper, in accordance with aspects of the present disclosure.

FIG. 5 is a top view of another embodiment of the loading system 12. In particular, FIG. 5 illustrated an embodiment of the loading system 12 in which the magnetic zipper 100 includes a single zipper section, such as the inner zipper section 102, which is configured to extend across all of the gap 30. In particular, in the illustrated embodiment, the inner zipper section 102 is configured to extend from the first set of adjustable links 140 below the turntable 18 to a reaction strip 190 that may be coupled to the outer platform 28. The reaction strip 190 may be a stationary component that is positioned below a surface 192 of the outer platform 28. For example, in some embodiments, the reaction strip 190 may include one or more pieces of metallic material to which the first magnets 122 and/or the first electromagnets 172 may attract. In other embodiments, the reaction strip 190 may include a plurality of permanent magnets (e.g., the second magnets 124) and/or a plurality of electromagnets (e.g., the second electromagnets 174) that are positioned adjacent to one another along the outer platform 28 and configured to engage with (e.g., magnetically couple to) the first magnets 122 and/or the first electromagnets 172. The reaction strip 190 may extend along the outer platform 28 to at least partially circumscribe the turntable 18.

It should be understood that the illustrated embodiment of the magnetic zipper 100 shown in FIG. 5 may operate in a similar manner to the embodiments of the magnetic zipper 100 discussed above with respect to FIGS. 3 and 4. For example, in some embodiments, the forward plow 150 may decouple the inner zipper section 102 from the reaction strip 190 as the ride vehicle 82 enters the loading path 26 to create the opening 154. As such, the support structure 84 of the transport 70 may propel the ride vehicle 82 along the gap 30 without interference with the magnetic zipper 100. In accordance with the techniques discussed above, the inner zipper section 102 may be magnetically re-coupled to the reaction strip 190 once the ride vehicle 82 passes a particular section of the magnetic zipper 100.

Figure 6:
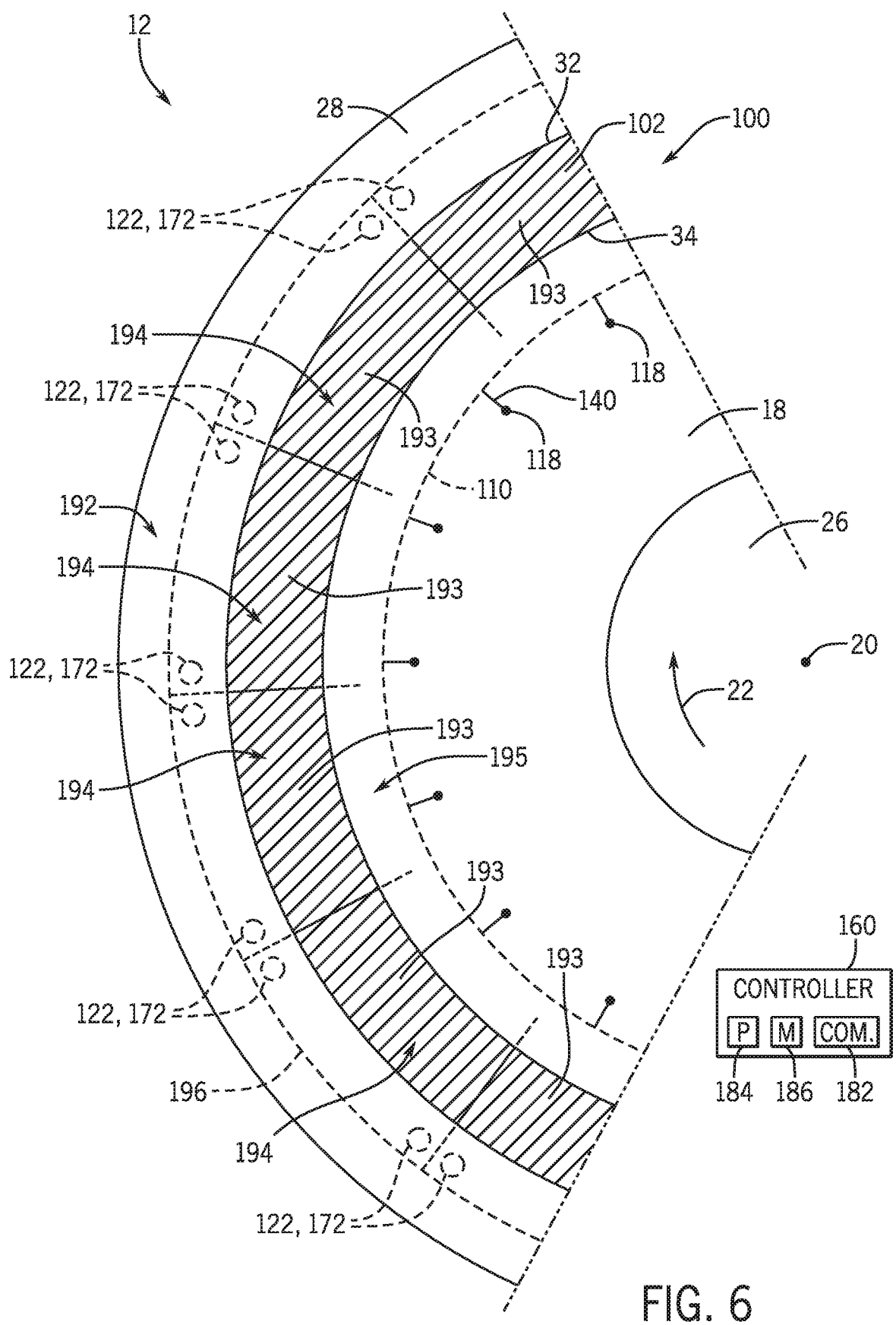
FIG. 6 is a schematic top view of an embodiment of a gap covering system for a ride system including a magnetic zipper, in accordance with aspects of the present disclosure.

FIG. 6 is a top view of another embodiment of the loading system 12. In particular, FIG. 6 illustrates an embodiment of the loading system 12 in which the magnetic zipper 100 is configured to rotate with the turntable 18 (e.g., about the axis 20). For example, in the illustrated embodiment, the outer zipper section 104 is omitted from the magnetic zipper 100. The inner support points 118 may be coupled to the turntable 18 or may include a portion of the turntable 18, such that the inner zipper section 102 is configured to rotate with the turntable 18 about the axis 20. The inner zipper section 102 may be segmented into a plurality of zipper segments 193 that extend from an inner rim 195 (e.g., a portion of the inner zipper section 102 proximate the first end portion 110) of the inner zipper section 102. In other embodiments, each of the zipper segments 193 may include an individual piece of material that is separate from the remaining zipper segments 193 of the inner zipper section 102.

In any case, each of the zipper segments 193 may include a plurality of the first magnets 122 coupled thereto. As an example, in the illustrated embodiment, each of the zipper segments 193 is associated with a pair of the first magnets 122. The zipper segments 193 are configured to, in respective engaged configurations 194, span across the gap 30 to permit the first magnets 122 to engage (e.g., magnetically coupled to) a reaction strip 196 (e.g., the reaction strip 190) that may be coupled to the outer platform 28. Accordingly, in the engaged configurations 194, the zipper segments 193 may cover the gap 30.

The reaction strip 196 may include a relatively smooth engagement surface (e.g., a surface to which the first magnets 122 are configured to attract), thereby enabling the first magnets 122 to translate (e.g., slide) along the reaction strip 196 during operation of the loading system 12. That is, the reaction strip 196 permits the first magnets 122 to slide along the engagement surface in the clockwise direction 22 while the first magnets 122 are engaged with the reaction strip 196. Accordingly, the turntable 18 and the zipper segments 193 may, collectively, rotate about the axis 20 while the zipper segments 193 are in their respective engaged configurations 194. It should be appreciated that an engagement force between the first magnets 122 and the reaction strip 196 may be sufficient to permit one or more guests to stand on a surface of the zipper segments 193 when the zipper segments 193 are in the engaged configurations 194, without resulting in magnetic decoupling of the first magnets 122 with the reaction strip 196.

Figure 7:
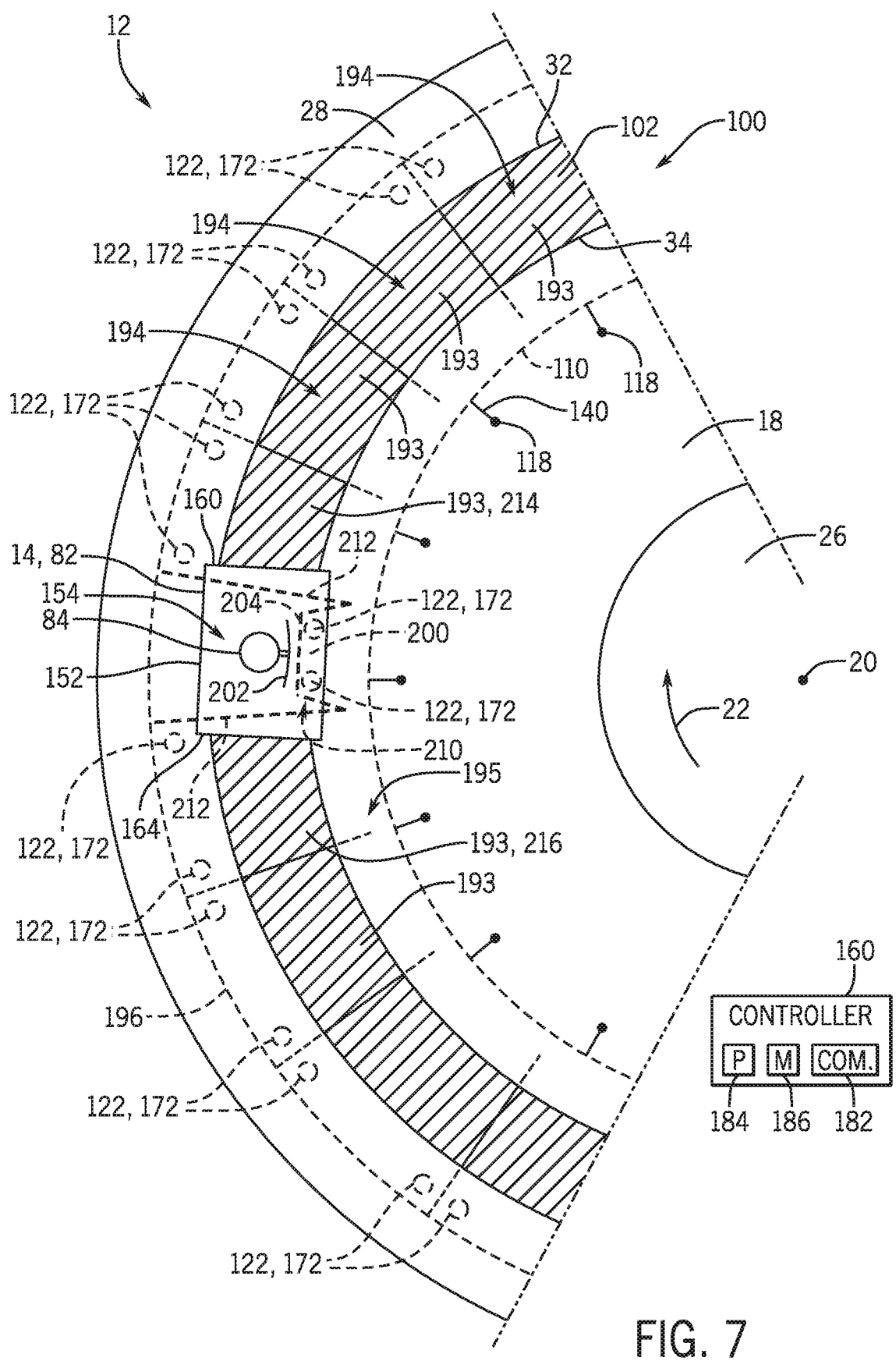
FIG. 7 is a schematic top view of an embodiment of a gap covering system for a ride system including a magnetic zipper, in accordance with aspects of the present disclosure.

FIG. 7 is a schematic of an embodiment of the loading system 12. Particularly, in the illustrated embodiment, one of the zipper segments 193, referred to herein as an adjacent segment 200, is magnetically decoupled from the reaction strip 196. Upon entering the loading path 36 via the entry avenue 50, a plow 202 (e.g., a lateral plow, the forward plow 150, the rearward plow 156) of the ride vehicle 82 may engage (e.g., physically contact) an outer edge of a particular zipper segment 193, such as an outer edge 204 the adjacent segment 200. Accordingly, upon entering the gap 30, the plow 202 may force the outer edge 204 in a direction away from the reaction strip 196 (e.g., generally inward toward the axis 20). A force provided by the plow 202 may be sufficient to magnetically decouple the first magnets 122 of the adjacent segment 200 from the reaction strip 196 and to permit the adjacent segment 200 to transition (e.g., due to gravity) to a drooped configuration 210 in which the adjacent segment 200 may hang generally downward (e.g., with respect to gravity) from the inner rim 195. Accordingly, when in the drooped configuration 210, the adjacent segment 200 may form the opening 154 that permits the support structure 84 of the robotic manipulator 80 to enter the gap 30 and travel along the gap 30 without interference with the magnetic zipper 100. In some embodiments, the chassis 152 of the ride vehicle 82 may be sized to cover (e.g., overlap with) the opening 154 when the adjacent segment 200 is in the drooped configuration 210. As such, ride system 10 components positioned within and/or below the gap 30 may remain substantially obscured to guests as the ride vehicle 82, the magnetic zipper 100, and the turntable 18 collectively rotate about the axis 20.

As noted above, in some embodiments, the controller 160 may be configured to determine a position of the ride vehicle 82 along the attraction path 16 and/or along the loading path 36. In such embodiments, the controller 160 may be configured to adjust operation of the ride system 10 to permit the support structure 84 to be positioned approximately equidistantly between respective edges 212 of a first zipper segment 214 and a second zipper segment 216 disposed adjacent to the adjacent segment 200. For example, the controller 160 may adjust a speed of the ride vehicle 82 in a variable speed zone of the attraction path 16 to ensure that support structure 84 is spaced approximately equidistantly between the respective edges 212 when entering the loading path 36.

In some embodiments, the loading system 12 may include an actuator 220, as shown in FIG. 1, which is configured to return the adjacent segment 200 to its respective engaged configuration 194 as the ride vehicle 82 exits the loading path 36 via the exit avenue 62. For example, the actuator 220 may be communicatively coupled to the controller 160 to permit the controller 160 to selectively adjust a position of the actuator 220. The controller 160 may instruct the actuator to move the outer edge 204 of the adjacent segment 200 toward the reaction strip 196 (e.g., as the inner zipper section 102 rotates about the axis 102 with the turntable 18) to permit the first magnets 122 to magnetically re-couple with the reaction strip 196 after the adjacent segment 200 rotates past the exit avenue 62.

In some embodiments, the loading system 12 may include an additional actuator 222 that is positioned near the entry avenue 50 and is configured to engage with respective edges of the zipper segments 193 in a similar manner to the actuator 220 discussed above. Particularly, the additional actuator 222 may temporarily support respective outer edges of certain of the zipper segments 193 as these zipper segments 193 rotate past the entry avenue 50 to permit the first magnets 122 of these zipper segments 193 to re-couple to the reaction strip 196 positioned on an opposite side of the entry avenue 50. In accordance with these techniques, the actuators 220, 222 may permit certain of the zipper segments 193 to temporarily magnetically decouple from the reaction strip 196 as the zipper segments 193 rotate past (e.g., about the axis 20) the exit avenue 62 and/or the entry avenue 50 and to subsequently magnetically re-couple to the reaction strip 196 upon passing the exit avenue 62 and/or the entry avenue 50, without transitioning to respective drooped configurations 210.

As noted above, in some embodiments of the loading system 12, the first magnets 122 may be replaced with the first electromagnets 172. In such embodiments, the controller 160 may be configured to de-energize respective first electromagnets 172 associated with the adjacent segment 200 when a particular ride vehicle, such as the ride vehicle 82, approaches the adjacent segment 200 from the entry avenue 50. Accordingly, the de-energized first electromagnets 172 of the adjacent segment 200 may permit the adjacent segment 200 to magnetically decouple from the reaction strip 196 and to transition (e.g., via gravity) to the drooped configuration 210 without engaging with the plow 202. The controller 160 may be configured to re-energize the first electromagnets 172 associated with the adjacent segment 200 when the outer edge 204 of the adjacent segment 200 is moved back toward the reaction strip 196 (e.g., via the actuator 220) when the ride vehicle 82 exits the loading path 36 at the exit avenue 62. Accordingly, the controller 160 permits first electromagnets 172 associated with the adjacent segment 200 to magnetically re-couple with the reaction strip 196, thereby enabling the adjacent segment 200 to return to its respective engaged configuration 194. It should be appreciate that an electrical slip-ring or another suitable device may be provided to permit transmission electrical current and/or communication signals between the first electromagnets 172 and the controller 160.

Figure 8:
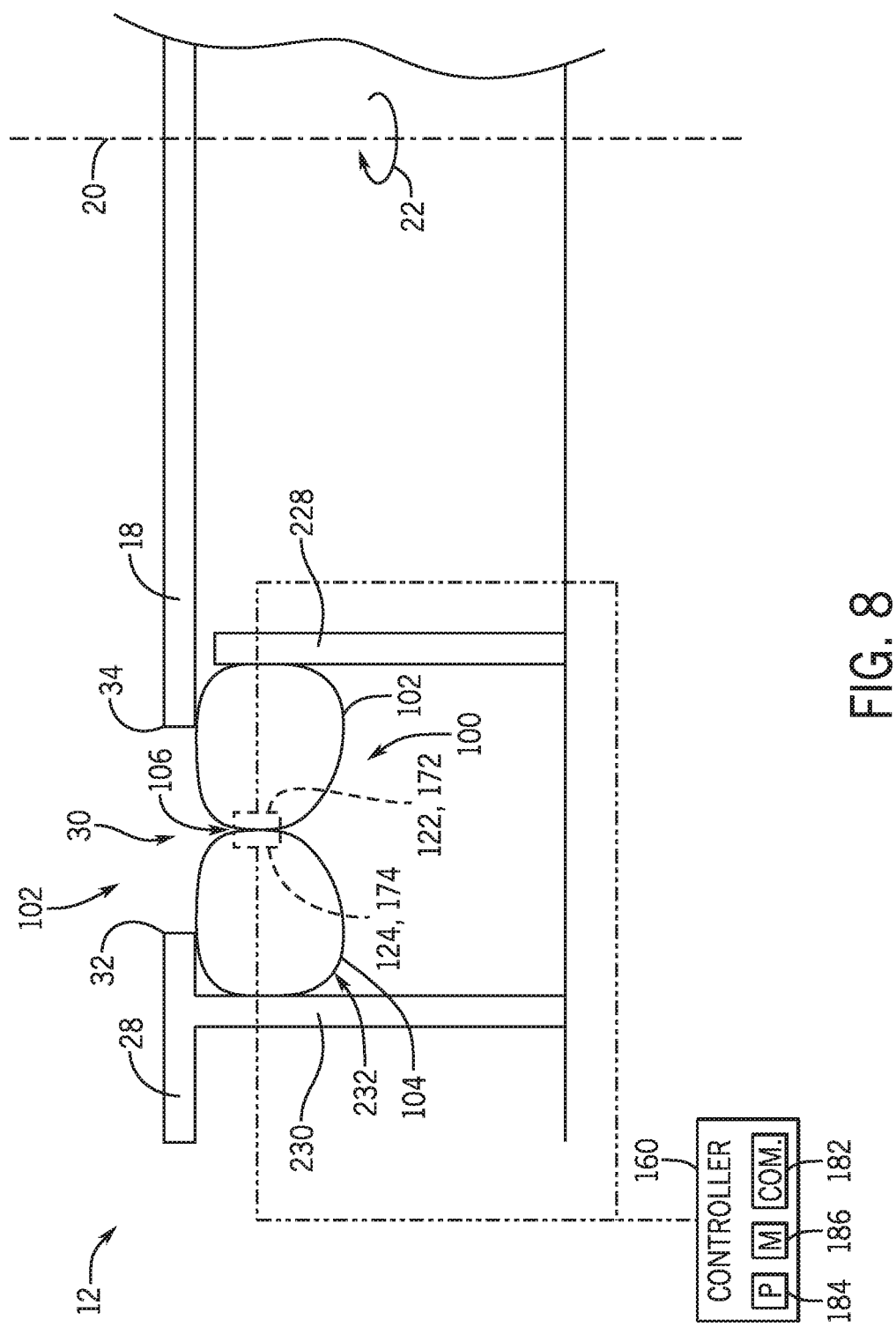
FIG. 8 is a schematic cross-sectional view of an embodiment of a gap covering system for a ride system including a magnetic zipper, in accordance with aspects of the present disclosure.

FIG. 8 is a cross-sectional view of an embodiment of the loading system 12. In some embodiments, the inner zipper section 102 and the outer zipper section 104 may each be an inflatable section that may be pressurized with a suitable fluid, such as air. The fluid may serve to both manipulate and provide structural support to the inner zipper section 102 and the outer zipper section 104. As shown in the illustrated embodiment, the inner zipper section 102 may be coupled to a first support 228 (e.g., a stationary support) that may be positioned below the turntable 18. The outer zipper section 104 may be coupled to a second support 230 (e.g., a stationary support) of the outer platform 28. In the illustrated embodiment, as the ride vehicle 82 approaches the gap 30 (e.g., from the entry avenue 50), the forward plow 150 may compress (e.g., push apart) the inner zipper section 102 and the outer zipper section 104 (e.g., at the interface 106) to make room for the support structure 84 of the robotic manipulator 80 extending through the gap 30 and traveling along the loading path 36. It should be understood that, in an inflated configuration 232 of the magnetic zipper 100, the inner and outer zipper sections 102, 104 may span across the gap 30 to cover the gap 30.

In some embodiments, the first magnets 122 may be replaced with the first electromagnets 172. As discussed above, a polarity of the electrical power supplied to the first electromagnets 172 may be selectively adjusted (e.g., reversed) to enable the first electromagnets 172 to attract or to repel the second magnets 124. That is, the first electromagnets 172 may be selectively transitioned between the attractive states and the repelling states to facilitate operation of the magnetic zipper 100. For example, when a particular section of the gap 30 does not include the ride vehicle 82, the first electromagnets 172 along that section may be transitioned to respective attractive states to attract corresponding ones of the second magnets 124. As such, the first electromagnets 172 and the second magnets 124 may magnetically couple to one another to stretch the inner and outer zipper sections 102, 104 across the gap 30. When the support structure 84 approaches the particular section of the gap 30, the first electromagnets 172 positioned along this section may be transitioned (e.g., via inputs sent from the controller 160) to respective repelling states to repel the corresponding second magnets 124. In this manner, the repulsive forces generated between the first electromagnets 172 and the second magnets 124 may facilitate separating the inner and outer zipper sections 102, 104 apart from one another as the support structure 84 approaches a particular portion of the gap 30. It should be appreciated that the first electromagnets 172 may be returned to respective attractive states (e.g., via inputs sent from the controller 160) to re-attract the second magnets 124 once the support structure 84 has passed a particular section of the magnetic zipper 100.

Figure 9:
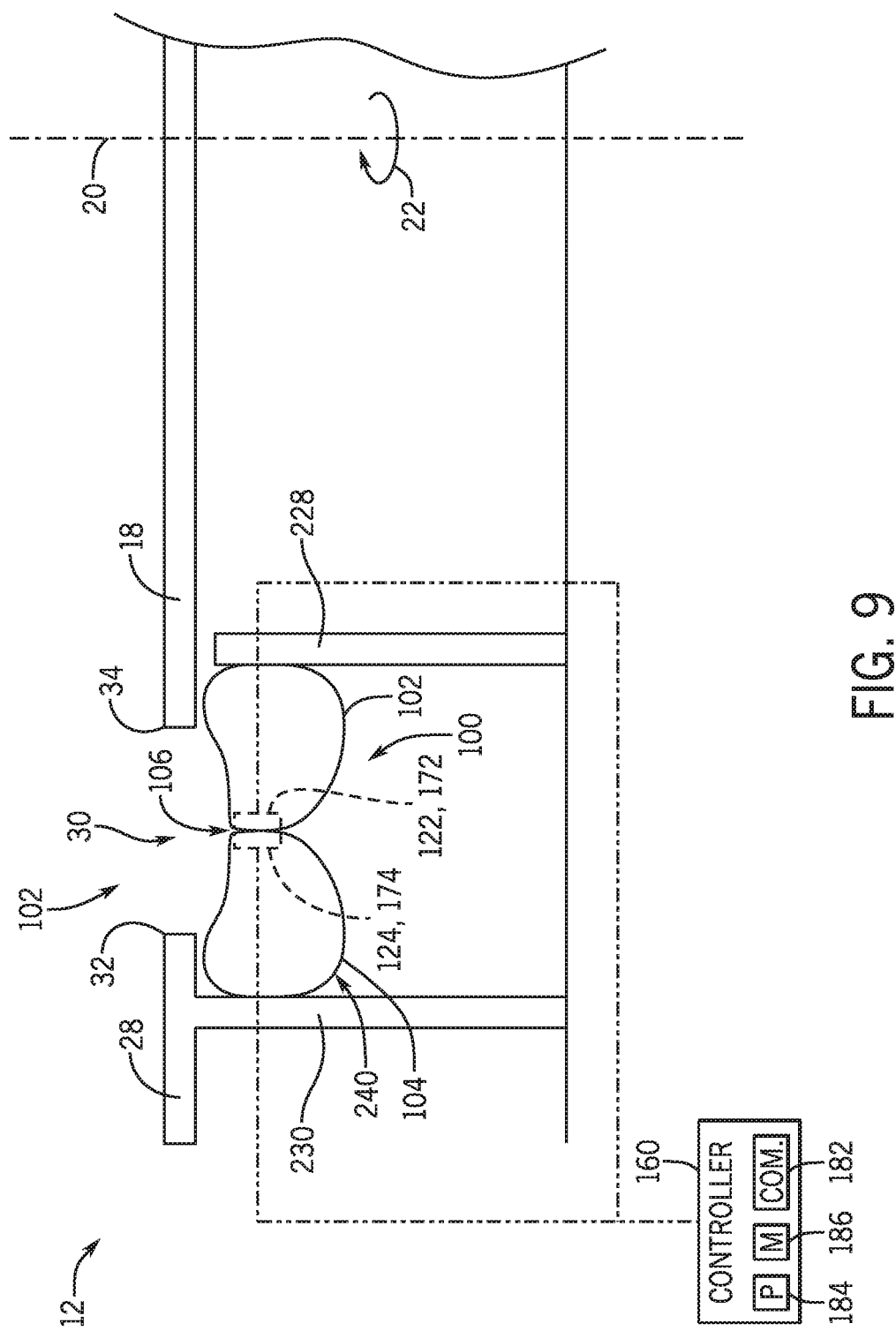
FIG. 9 is a schematic cross-sectional view of an embodiment of a gap covering system for a ride system including a magnetic zipper, in accordance with aspects of the present disclosure.

As discussed above, in some embodiments, the second magnets 124 (e.g., permanent magnets) may ensure that the gap 30 remains covered in the event of a power loss to the ride system 10 and/or during an abnormality in operation of a pump configured to inflate the inner and outer zipper sections 102, 104. For example, during a loss of power to the ride system 10 and/or an abnormality in pump operation, the inner and outer zipper sections 102, 104 may gradually deflate (e.g., due to fluid discharge from the inner and outer zipper sections 102, 104) and transition to a deflated configuration 240, as shown in FIG. 9. Moreover, the first and electromagnets 172 may transition to a de-energized state upon loss of electrical power to the first electromagnets 172. Even during such loss of electrical power, the second magnets 124 may continue to attract respective metallic cores (e.g., iron cores) of the first electromagnets 172 to ensure that the deflated inner zipper section 102 remains engaged with the deflated outer zipper section 104 to cover the gap 30. It should be understood that, in some embodiments, the first electromagnets 172 may be replaced with the first magnets 122 (e.g., permanent magnets) and the second magnets 124 may be replaced with the second electromagnets 174.

In some embodiments, certain sections of the magnetic zipper 100 may be configured to partially deflate or to fully deflate as the ride vehicle 82 approaches these sections of the magnetic zipper 100. As such, the magnetic zipper 100 may facilitate decoupling of, for example, the first magnets 122 and the second magnets 124 (e.g., via the forward plow 150), by reducing a force that may be involved to push apart the deflated inner zipper section 102 from the deflated outer zipper section 104. The magnetic zipper 100 may be re-inflated (e.g., via a suitable pump of the loading system 12) to expand previously deflated sections of the magnetic zipper 100 once the support structure 84 has passed these sections, thereby facilitating magnetic re-coupling of the first and second magnets 122, 124. In other words, a suitable pump (e.g., via instructions provided by the controller 160) may keep inflated portions of the magnetic zipper 100 that are positioned forward and aft of the ride vehicle 82 inflated as the ride vehicle 82 travels along the loading path 36, and may instruct the pump to deflate portions of the magnetic zipper 100 disposed adjacent to the ride vehicle 82 (e.g., portions of the magnetic zipper 100 disposed beneath the chassis 152) as the ride vehicle 82 travels along the loading path 36.

As set forth above, embodiments of the present disclosure may provide one or more technical effects useful for covering a gap in an amusement park attraction that may expose aesthetically unappealing components of the attraction to guests interacting with the attraction. In particular, the disclosed magnetic zipper 100 may selectively cover the gap 30 between the turntable 18 and the outer platform 28 to cover and block visibility to certain components that may be positioned within and/or below the gap 30, while still enabling ride vehicles 14 to travel along the gap 30 during operation of the loading system 12. In this manner, the magnetic zipper 100 may provide an aesthetically pleasing cover for the gap 30 while guests utilize the loading system 12 to load into and/or unload from the non-stationary ride vehicles 14. It should be understood that the technical effects and technical problems in the specification are examples and are not limiting. Indeed, it should be noted that the embodiments described in the specification may have other technical effects and can solve other technical problems.

While only certain features of present embodiments have been illustrated and described herein, many modifications and changes will occur to those skilled in the art. It is, therefore, to be understood that the appended claims are intended to cover all such modifications and changes that fall within the true spirit of the disclosure. Further, it should be understood that certain elements of the disclosed embodiments may be combined or exchanged with one another.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A gap covering system for an amusement park attraction, comprising:
 a loading platform having a gap separating a first portion of the loading platform from a second portion of the loading platform;
 a ride vehicle coupled, through the gap, to a transport, wherein the transport is configured to propel the ride vehicle along a loading path of the loading platform; and
 a magnetic zipper positioned adjacent to the loading platform and configured to transition between a first configuration and a second configuration in at least a portion of the magnetic zipper, wherein the magnetic zipper is configured to cover the gap in the first configuration and is configured to allow the ride vehicle to occupy a guest-accessible position on the loading platform in the second configuration.

2. The gap covering system of claim 1, wherein the magnetic zipper comprises a first section extending from the first portion of the loading platform and having a first plurality of magnets and a second section extending from the second portion of the loading platform and having a second plurality of magnets, wherein the first plurality of magnets is configured to magnetically couple to the second plurality of magnets in the first configuration of the magnetic zipper.

3. The gap covering system of claim 2, wherein the first section is a first inflatable section and the second section is a second inflatable section, wherein the first and second inflatable sections are configured to receive a fluid to inflate and facilitate transitioning the magnetic zipper to the first configuration.

4. The gap covering system of claim 2, wherein the first plurality of magnets comprises permanent magnets and the second plurality of magnets comprises electromagnets, wherein each of the first plurality of magnets attract respective ones of the second plurality of magnets when the second plurality of magnets is in a de-energized state, and wherein the second plurality of magnets repels respective ones of the first plurality of magnets when the second plurality of magnets is in an energized state.

5. The gap covering system of claim 2, wherein the ride vehicle comprises an engagement feature configured to interface with the magnetic zipper, wherein the engagement feature is configured to sequentially magnetically decouple magnets of the first plurality of magnets from corresponding magnets of the second plurality of magnets as the ride vehicle travels along the loading path to transition the magnetic zipper from the first configuration to the second configuration.

6. The gap covering system of claim 5, comprising a controller communicatively coupled to the first plurality of magnets and the second plurality of magnets, wherein the controller is configured to sequentially transition the first and second plurality of magnets between respective energized states and respective de-energized states based on a ride vehicle position to facilitate transitioning the magnetic zipper between the first configuration and the second configuration, respectively.

7. The gap covering system of claim 1, wherein the magnetic zipper comprises a first plurality of biased supports coupled to a first section of the magnetic zipper extending from the first portion of the loading platform and having a first plurality of magnets and a second plurality of biased supports coupled to a second section of the magnetic zipper extending from the second portion of the loading platform and having a second plurality of magnets.

8. A gap covering system for a ride system of an amusement park, comprising:
   a turntable configured to rotate about an axis;
   an outer platform disposed about the turntable to form a gap between the turntable and the outer platform;
   a ride vehicle coupled, through the gap, to a transport, wherein the transport is configured to propel the ride vehicle about the axis; and
   a magnetic zipper having a first section extending outwardly from the turntable and a second section extending from the outer platform toward the first section, wherein the first and second sections are configured to engage at an interface to cover the gap in a first configuration of the magnetic zipper, wherein the magnetic zipper is configured to transition from the first configuration to a second configuration in a portion of the magnetic zipper that permits the ride vehicle to occupy a guest-accessible position along the turntable.

9. The gap covering system of claim 8, wherein the magnetic zipper comprises a first plurality of magnets coupled to the first section and a second plurality of magnets coupled to the second section, wherein the first and second plurality of magnets are configured to magnetically couple to one another in the first configuration of the magnetic zipper.

10. The gap covering system of claim 9, wherein the first section comprises a first inflatable section and the second section comprises a second inflatable section, wherein the first and second inflatable sections are configured to receive a fluid to inflate and facilitate magnetically coupling the first and second plurality of magnets to one another in the first configuration of the magnetic zipper.

11. The gap covering system of claim 9, wherein the first plurality of magnets comprises first electromagnets and the second plurality of magnets comprises second permanent magnets, wherein the second permanent magnets are configured to attract corresponding first electromagnets when the first electromagnets are in respective de-energized states, and wherein the first electromagnets are configured to repel corresponding second permanent magnets when the first electromagnets are in respective energized states.

12. The gap covering system of claim 8, wherein the first section comprises a first plurality of magnets and the second section comprises a second plurality of magnets, wherein the first plurality of magnets or the second plurality of magnets comprises electromagnets that are selectively transitionable between attractive states and repelling states to permit the magnetic zipper to transition between the first configuration and the second configuration, respectively.

13. The gap covering system of claim 12, comprising a controller communicatively coupled to the electromagnets to cause the electromagnets to sequentially transition between the attractive states and the repelling states based on a ride vehicle position.

14. The gap covering system of claim 8, wherein the first and second sections of the magnetic zipper are made of polypropylene mesh, vinyl or nylon coated fabrics, rubber, plastic, polyurethane, or a combination thereof.

15. The gap covering system of claim 8, wherein the first section is coupled to one or more supports positioned beneath the turntable and the second section is coupled to one or more supports of the outer platform via length-adjustable links, springs, or both.

16. The gap covering system of claim 8, wherein the first section and the second section are coupled to one or more biased supports that are actuated to transition the magnetic zipper between the first configuration and the second configuration.

17. A method of operating a gap covering system for an amusement park attraction, comprising:
   magnetically coupling a first section of a magnetic zipper to a second section of the magnetic zipper to form a surface that extends across a gap of a loading platform to cover the gap;
   propelling a ride vehicle along a path adjacent to the loading platform via a transport; and
   magnetically decoupling the first section from the second section along at least a portion of the magnetic zipper as the ride vehicle travels along the path to form an opening in the magnetic zipper, wherein a support structure extends through the opening to couple the ride vehicle to the transport.

18. The method of claim 17, wherein magnetically coupling the first section to the second section comprises transitioning respective electromagnets comprised in the first section to de-energized states to enable respective permanent magnets comprised in the second section to attract metallic cores of the respective electromagnets, wherein magnetically de-coupling the first section from the second section comprises transitioning the respective electromagnets comprised in the first section to energized states to repel the respective permanent magnets comprised in the second section and form the opening.

19. The method of claim 17, wherein magnetically coupling the first section to the second section comprises transitioning first electromagnets comprised in the first section and second electromagnets comprised in the second section to respective attractive states to enable the first and second electromagnets to attract one another, wherein magnetically de-coupling the first section from the second section comprises transitioning the first electromagnets comprised in the first section and the second electromagnets comprised in the second section to respective repelling states to enable the first and second electromagnets to repel one another and form the opening.

20. The method of claim 17, comprising inflating the first section and the second section of the magnetic zipper with a fluid to facilitate magnetically coupling the first section of the magnetic zipper to the second section of the magnetic zipper.

* * * * *